United States Patent [19]

Kahaney

[11] Patent Number: 4,976,531
[45] Date of Patent: Dec. 11, 1990

[54] EYEGLASSES RETAINER STRAP

[76] Inventor: Alan Kahaney, 2212 Place Monaco, Del Mar, Calif. 92014

[21] Appl. No.: 441,759

[22] Filed: Nov. 27, 1989

[51] Int. Cl.⁵ .............................................. G02C 3/00
[52] U.S. Cl. ..................................... 351/156; 351/157
[58] Field of Search ...................... 351/156, 157, 123; 2/452; 24/3 C

[56] References Cited

U.S. PATENT DOCUMENTS 4,790,646  12/1988  Seron ............................. 351/157 X Primary Examiner—Rodney B. Bovernick
Attorney, Agent, or Firm—Charles C. Logan, II

[57] ABSTRACT

The novel eyewear retainer strap is usable with all spectacle frames and sunglasses. It has an elongated strip of stretchable neoprene material. The respective ends of the elongated member are folded back upon themselves to form a loop that passes through a slot on the rear end of a triangularly shaped connection member. Snap assemblies secure the end of the elongated member to itself. A tubular sleeve is detachably received on the front ends of the respective triangularly shaped connection members and the forward end of the tubular sleeves detachably receive the ear retainer portions of the temple members of a pair of eyeglasses. When the ear retainer portions of the eyeglasses have an aperture in them, the snap assemblies may be detachably secured therein without the use of the rubber sleeve.

4 Claims, 2 Drawing Sheets

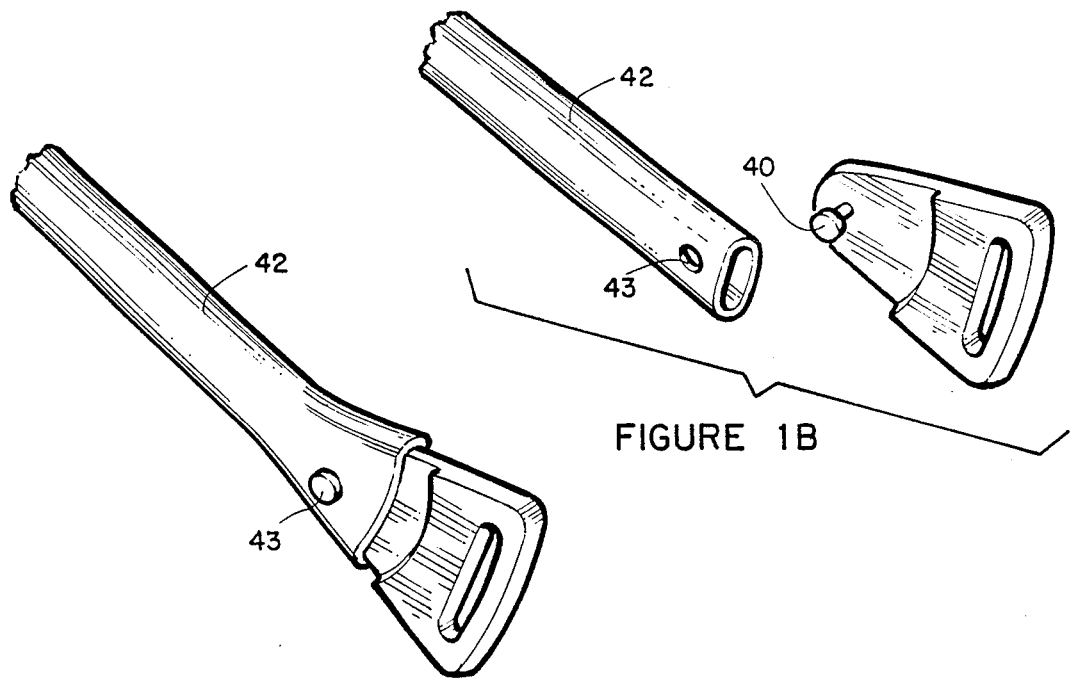
FIGURE 1A
FIGURE 1B
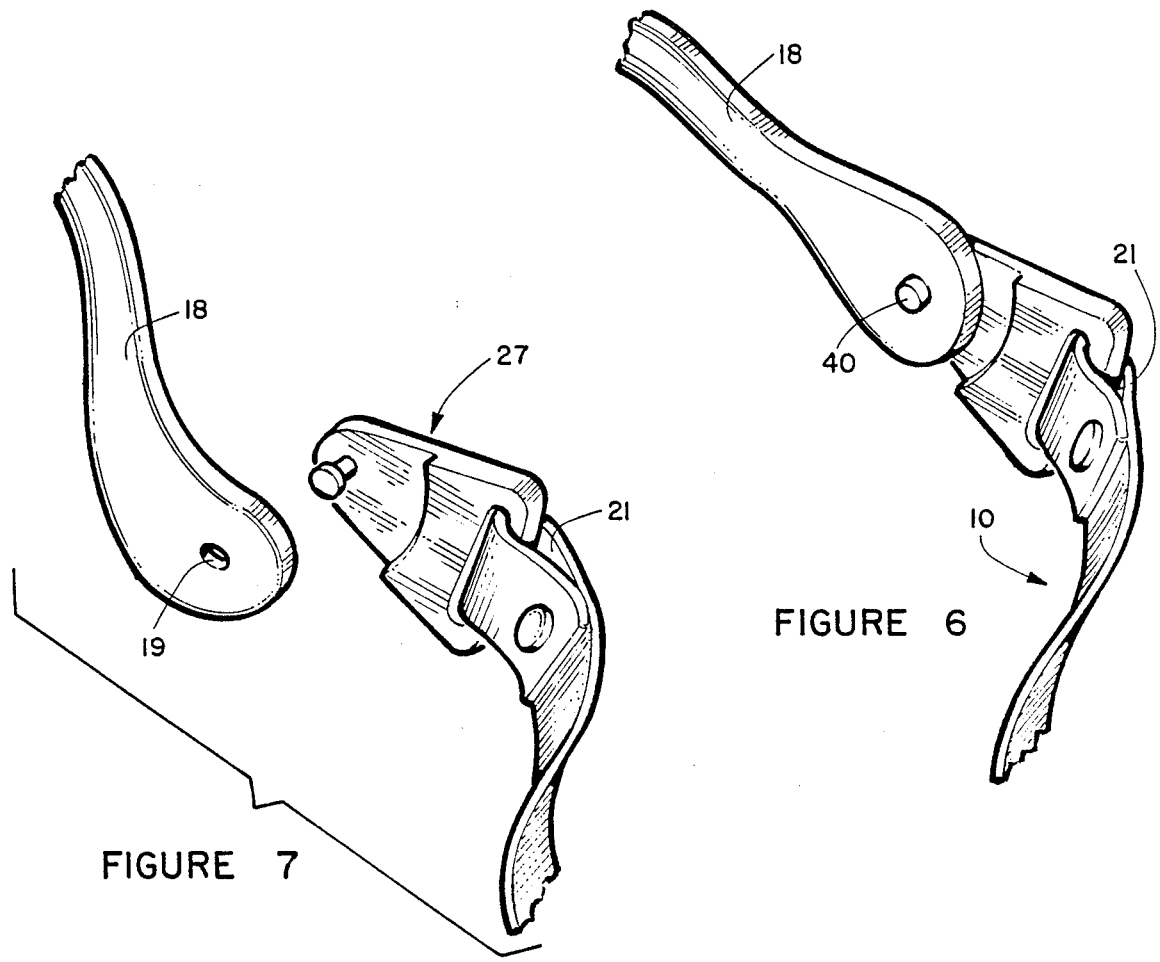
FIGURE 7
FIGURE 6

EYEGLASSES RETAINER STRAP

BACKGROUND OF THE INVENTION

The invention relates to glasses such as spectacles and sunglasses.

Presently many people wear spectacles or sunglasses while participating in sports and other activities. Often the glasses fall off or are knocked off during the activities. Other times it is an inconvenience taking one's glasses off and and having to find a place to keep them such as ones forehead, a pocket, a purse, or just holding them in one's hand.

It is an object of the invention to provide a novel eyeglasses retainer strap that is easily and quickly detachably secured to the ends of the temple members of a pair of eyeglasses, or sunglasses holding the eyewear to the head so they don't cause harm while engaged in active movement.

It is a further object of the invention to provide a novel eyeglasses retainer strap that has structure for attaching its ends to apertures formed in the ear retainer portion of the temple members of a pair of eyeglasses.

It is an additional object of the invention to provide a novel eyeglasses retainer strap that is economical to manufacture and market.

SUMMARY OF THE INVENTION

The novel eyeglasses retainer strap is preferably formed from a stretchable elastic material such as neoprene. It is configured in the shape of an elongated strip of material that has its opposite ends looped back upon themselves with their ends secured to the elongated strip of material by snap fastener assemblies. The looped portion passes through slots in the rear end of triangularly shaped connection members. The front end of the connection members is removably received in one end of its respective tubular rubber sleeve. The opposite ends of the tubular sleeves removably receive the ends of the ear retainer portions of the temple members of a pair of eyeglasses.

The eyeglass retainer strap has added versatility so that it can be used in a different manner with eyeglasses having ear retainer portions having laterally extending apertures therein. With this structure the triangularly shaped connection members have their tubular sleeves removed so that the base extending laterally from the triangularly shaped connecting members may be passed through the aperture in the ear retainer portion.

The elongated strips of soft neoprene material may have different colors on each side, allowing them to coordinate with different clothing.

BRIEF DESCRIPTION OF THE DRAWING

FIG. 1A is a perspective view showing how the tubular sleeve is attached to the triangularly shaped connection member;

FIG. 1B is an exploded view of the structure illustrated in FIG. 1A;

FIG. 6 is a partial perspective view showing the triangularly shaped connection member with its protrusion captured in the aperture in the temple member; and FIG. 7 is an exploded view of FIG. 6.

DESCRIPTION OF THE PREFERRED EMBODIMENT

Figures 1, 2, 3, 4, 5:
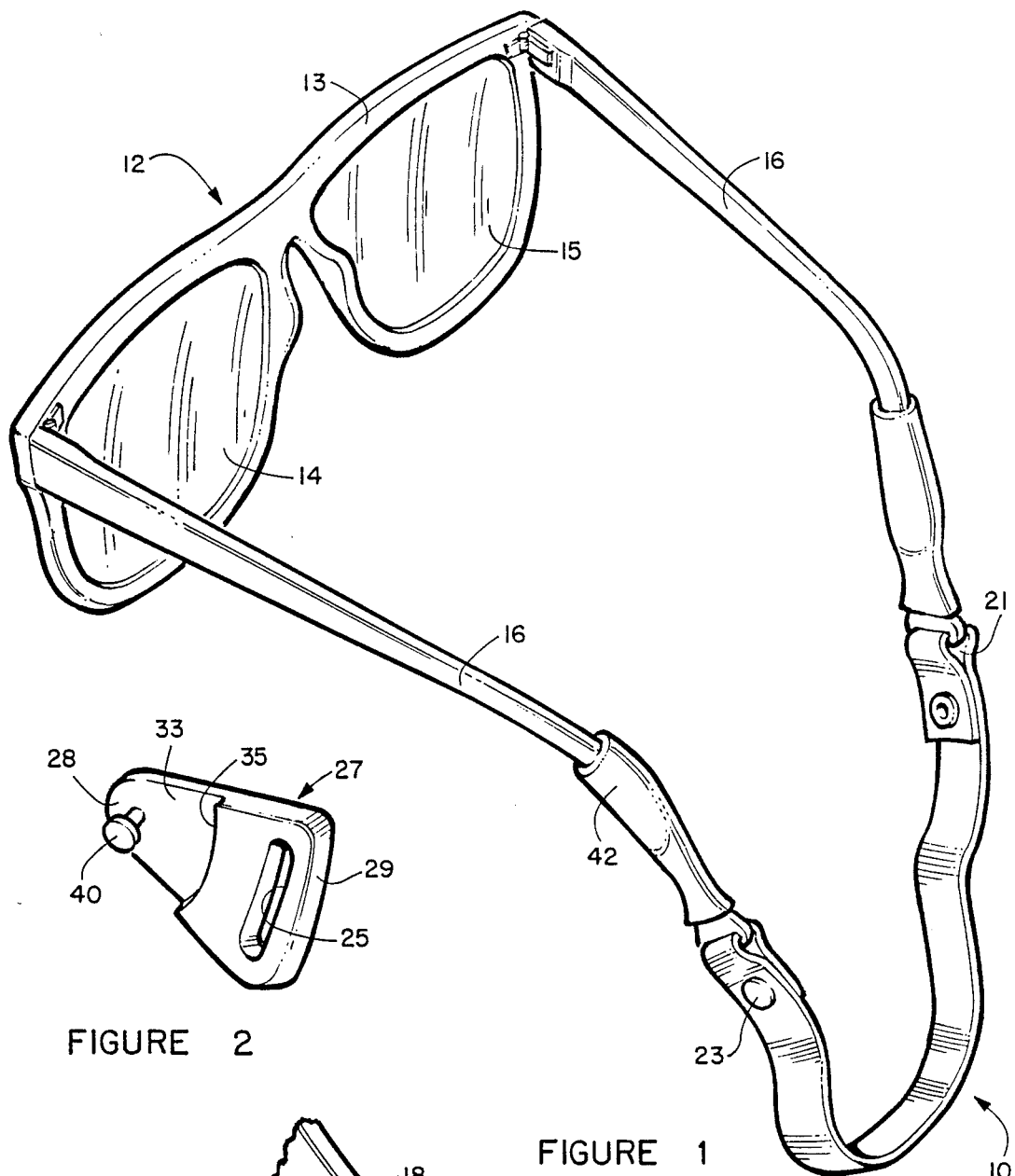
FIG. 1 is a perspective view illustrating the novel eyeglasses retainer strap secured to a pair of eyeglasses.
FIG. 2 is a front perspective view of one of the triangularly shaped connection members.
FIG. 3 is a partial perspective view illustrating the aperture formed in the eye retainer portion of a temple member.
FIG. 4 is a partial top side elevation view of one of the ends of the elongated strip member.
FIG. 5 is a top plan view of the structure illustrated in FIG. 4.

The novel structure of the eyeglasses retaining strap will now be described by referring to FIGS. 1-5 of the drawing. The eyeglasses retainer strap is generally designated numeral 10.

The eyeglasses 12 have a main frame 13 and lenses 14 and 15. A pair of temple members 16 have their front ends secured to main frame 13.

Eyeglasses retainer strap 10 is preferrably formed from an elongated strip of neoprene material that has its opposite ends folded back upon themselves to form loops 20 and 21. Snap fastener assemblies 23 secure the overlapped portions. The respective loops pass through slots 25 in triangularly shaped connection members 27. Connection members 27 have a front end 28, a rear end 29, and sides 30 and 31. A relieved side surface 33 is formed on side 30 and it forms a shoulder 35. A boss member or protrusion 40 extends outwardly from relieved side surface 33. A tubular sleeve 42 of material such as rubber has its rear end removably receiving front end 28 and boss 40 of triangularly shaped connection member 27. Tubular sleeve 42 has an aperture 43 adjacent its rear end for removably receiving base member 40. The front end of tubular sleeve 42 removably receives the ear retainer portion 18 of temple members 16.

Eyeglasses retainer strap 10 has versatility which allows it to be used in a different manner with eyeglasses whose ear retainer portions have an aperture 19 formed in them (see FIG. 3. In this embodiment the triangularly shaped connection members 27 have their tubular sleeves 42 removed exposing the boss member or protrusion 40 so it may be directly snapped into the temple aperature 19.

What is claimed is:

1. An eyeglasses retainer strap comprising:
   an elongated member having a left end and a right end, said elongated member having a predetermined length and having a front surface and rear surface;
   a pair of connecting members each having a front end, a rear end, and laterally spaced side surfaces;
   an elongated slot adjacent the rear end of each of said connecting members for detachably receiving one of the ends of said elongated member;
   means adjacent the front end of each of said connecting members for detachably receiving one of the ear retainer portions of a temple member of a pair of eyeglasses;
   said elongated member is formed from a flat strip of material that has each of its ends folded back upon itself to form a loop that passes through said elongated slot; and
   snap fastener assembly means for detachably securing the respective ends of said elongated member to said elongated member after they have been folded back upon themselves.

2. An eyeglasses retainer strap as recited in claim 1 wherein said snap fastener assembly means comprises a pair of assemblies each having a female member and a male member, said male member having a shank that is detachably insertable through an aperture in the rear retainer portion of a temple member of a pair of eyeglasses.

3. An eyeglasses retainer strap comprising:
   an elongated member having a left end and a right end, said elongated member having a predetermined length and having a front surface and rear surface;
   a pair of connecting members each having a front end, a rear end, and laterally spaced side surfaces;
   an elongated slot adjacent the rear end of each of said connecting members for detachably receiving one of the ends of said elongated member; and
   means adjacent the front end of each of said connecting members for detachably receiving one of the ear retainer portions of the temple member of a pair of sunglasses comprising a boss member extending laterally from one of the sides of said connecting member and a tubular sleeve whose one end is detachably received over said front end and said boss member and whose other end would be detachably received on the end of one of the eyeglass retainer portions.

4. An eyeglasses retainer strap as recited in claim 3 wherein said elongated member is made of stretchable neoprene material.

* * * * *